US011891025B2

(12) United States Patent
Brown

(10) Patent No.: US 11,891,025 B2
(45) Date of Patent: Feb. 6, 2024

(54) AUTOMATIC TIRE INFLATOR ASSEMBLY

(71) Applicant: Joseph Brown, Collingdale, PA (US)

(72) Inventor: Joseph Brown, Collingdale, PA (US)

( * ) Notice: Subject to any disclaimer, the term of this patent is extended or adjusted under 35 U.S.C. 154(b) by 750 days.

(21) Appl. No.: 17/008,835

(22) Filed: Sep. 1, 2020

(65) Prior Publication Data
US 2022/0063570 A1     Mar. 3, 2022

(51) Int. Cl.
*B60S 5/04*         (2006.01)
*G01L 19/12*        (2006.01)
*G01L 19/10*        (2006.01)

(52) U.S. Cl.
CPC ............ *B60S 5/046* (2013.01); *G01L 19/10* (2013.01); *G01L 19/12* (2013.01)

(58) Field of Classification Search
CPC .............. B60S 5/046; F04F 5/48; F04F 5/50
USPC ............................................ 137/227; 141/38
See application file for complete search history.

(56) References Cited

U.S. PATENT DOCUMENTS

| | | | |
|---|---|---|---|
| 4,998,438 A * | 3/1991 | Martin | B60C 23/0406 D10/86 |
| D362,669 S | 9/1995 | Conroy | |
| 6,067,850 A | 5/2000 | Lang | |
| 7,975,731 B2 | 7/2011 | Shultz | |
| 8,191,586 B2 | 6/2012 | Huval | |
| 2007/0237652 A1* | 10/2007 | Belanger | B60C 23/0479 417/279 |
| 2009/0260710 A1* | 10/2009 | Huval | B60S 5/046 141/38 |
| 2010/0108187 A1* | 5/2010 | Lolli | B29C 73/166 141/38 |
| 2012/0168030 A1* | 7/2012 | Ohm | F04B 35/06 141/94 |
| 2017/0032608 A1 | 2/2017 | Burrows | |
| 2019/0322247 A1 | 10/2019 | Hibbard | |

FOREIGN PATENT DOCUMENTS

WO       WO9739925       10/1997

* cited by examiner

Primary Examiner — Daphne M Barry

(57) ABSTRACT

An automatic tire inflator assembly includes an input hose that is fluidly attachable to an air source to receive compressed air from the air source. An output hose is fluidly attachable to an air stem of an inflatable tire. A control unit is fluidly coupled to the input hose to receive the compressed air from the air source. Additionally, the control unit is fluidly coupled to the output hose to inflate the inflatable tire. A gauge is fluidly coupled to the control unit and the gauge is settable to determine the pre-determined threshold pressure. The control unit is turned off when the gauge measures air pressure that exceeds the pre-determined threshold pressure to inflate the inflatable tire to a desired air pressure.

9 Claims, 5 Drawing Sheets

AUTOMATIC TIRE INFLATOR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to inflator devices and more particularly pertains to a new inflator device for automatically inflating an inflatable tire to a pre-determined pressure.

(2) Description of Related Art Including Information Disclosed Under 37 CFR 1.97 and 1.98

The prior art relates to inflator devices including an inflation device for evacuating air from a tire and inflating the tire with nitrogen. The prior art discloses an inflation device for simultaneously inflating a plurality of tires with a single air source. The prior art also discloses a variety of tire inflation devices that each includes an air hose that is coupled to a control unit for controlling the inflation of an inflatable tire. In each case the inflation device is mounted in a permanent location.

BRIEF SUMMARY OF THE INVENTION

An embodiment of the disclosure meets the needs presented above by generally comprising an input hose that is fluidly attachable to an air source to receive compressed air from the air source. An output hose is fluidly attachable to an air stem of an inflatable tire. A control unit is fluidly coupled to the input hose to receive the compressed air from the air source. Additionally, the control unit is fluidly coupled to the output hose to inflate the inflatable tire. A gauge is fluidly coupled to the control unit and the gauge is settable to determine the pre-determined threshold pressure. The control unit is turned off when the gauge measures air pressure reaching or exceeding the pre-determined threshold pressure to inflate the inflatable tire to a desired air pressure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
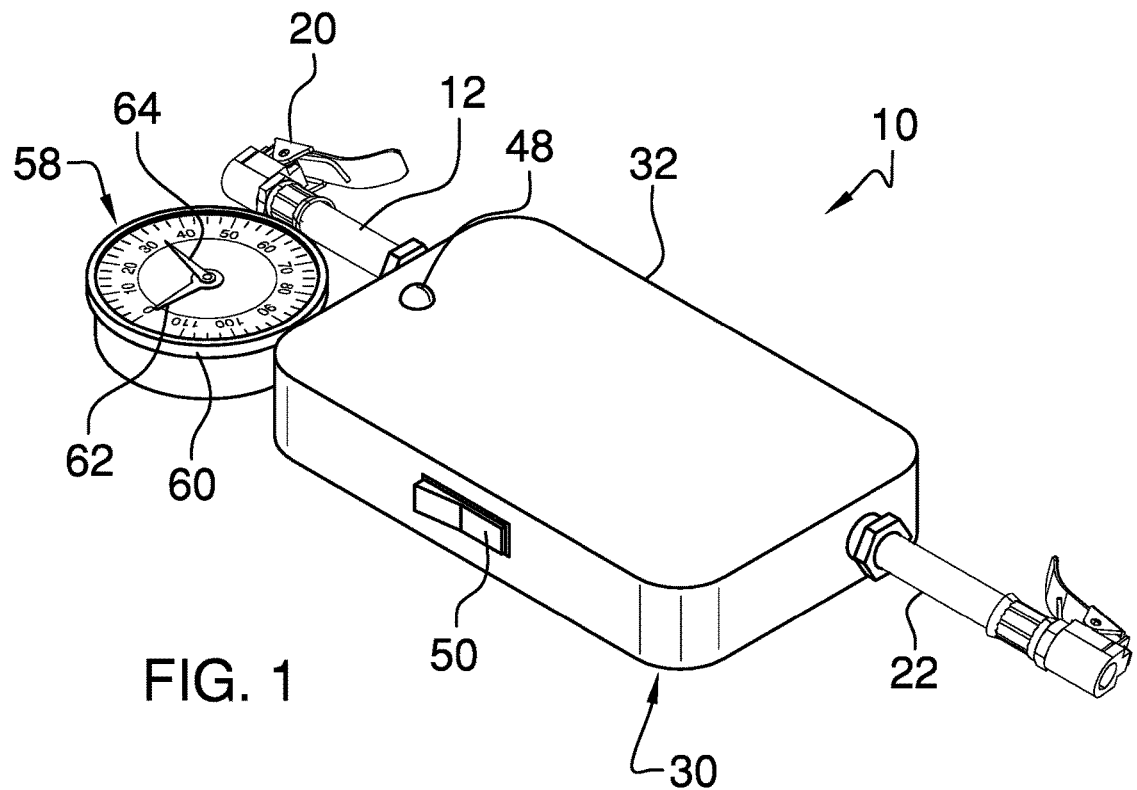
FIG. 1 is a perspective view of an automatic tire inflator assembly according to an embodiment of the disclosure.
Figure 2:
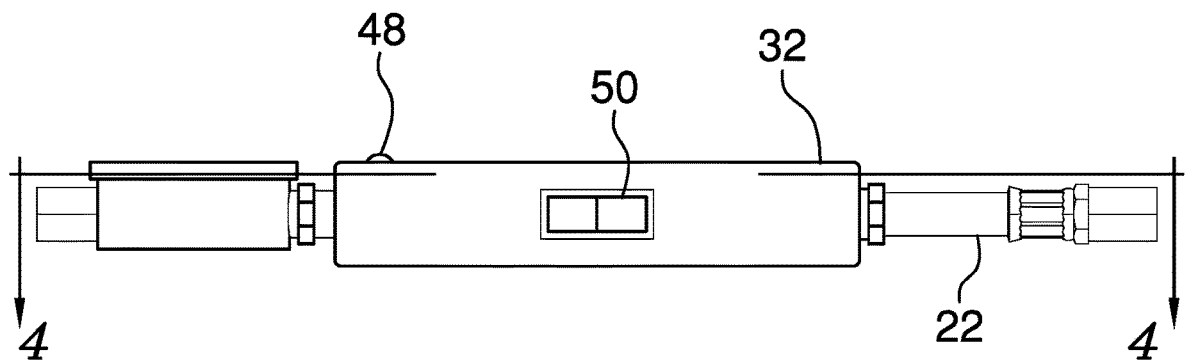
FIG. 2 is a right side view of an embodiment of the disclosure.
Figure 3:
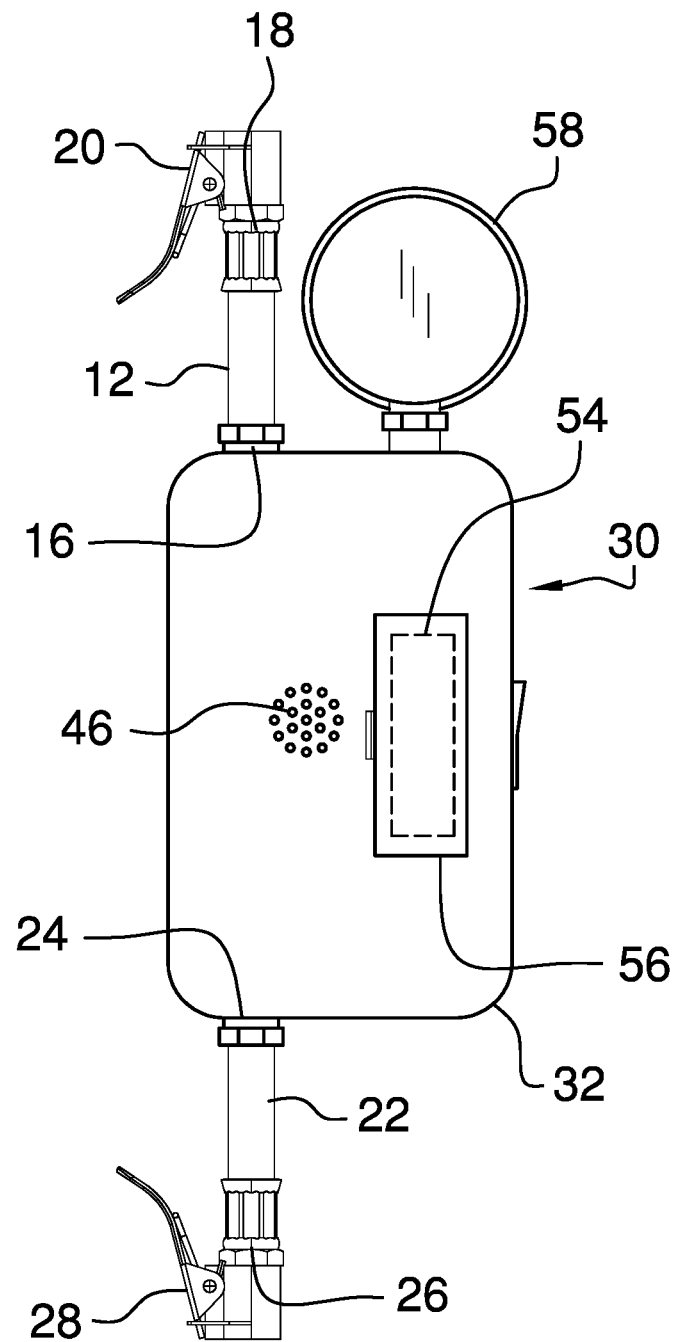
FIG. 3 is a bottom view of an embodiment of the disclosure.
Figure 4:
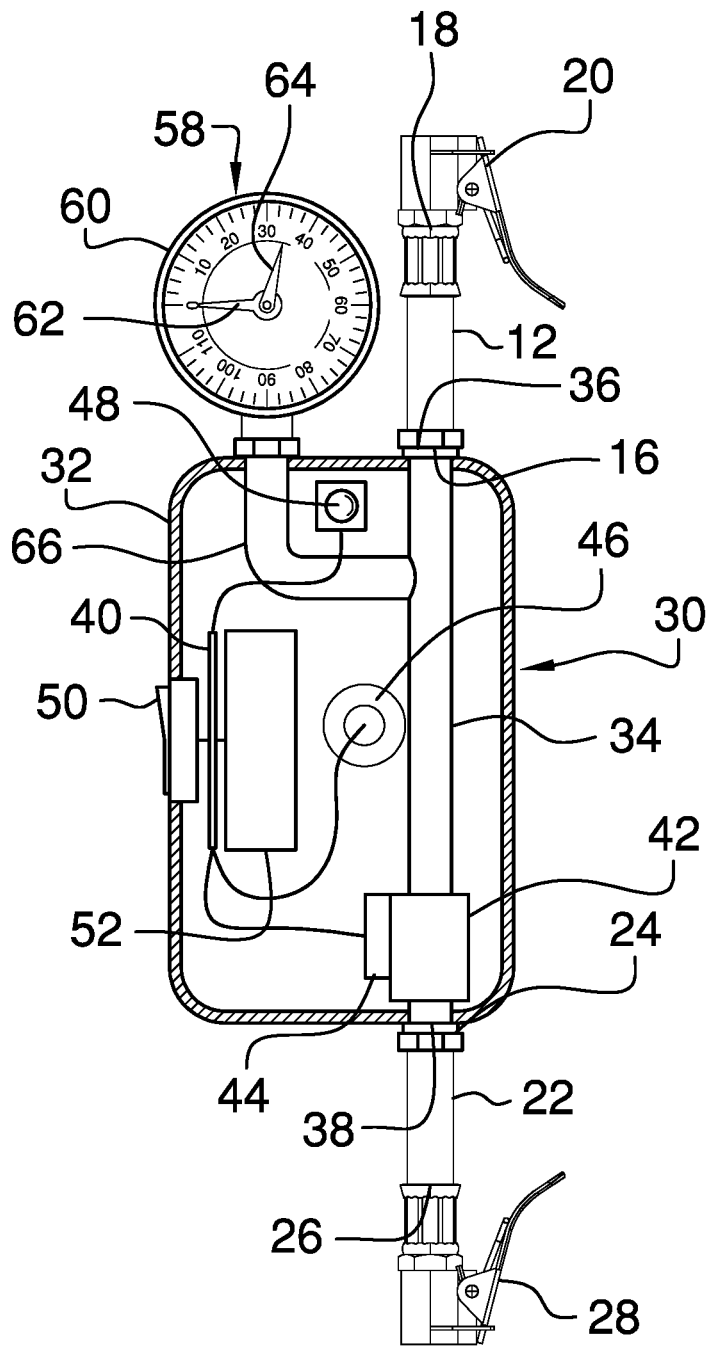
FIG. 4 is a cross sectional view taken along line 4-4 of FIG. 2 of an embodiment of the disclosure.
Figure 5:
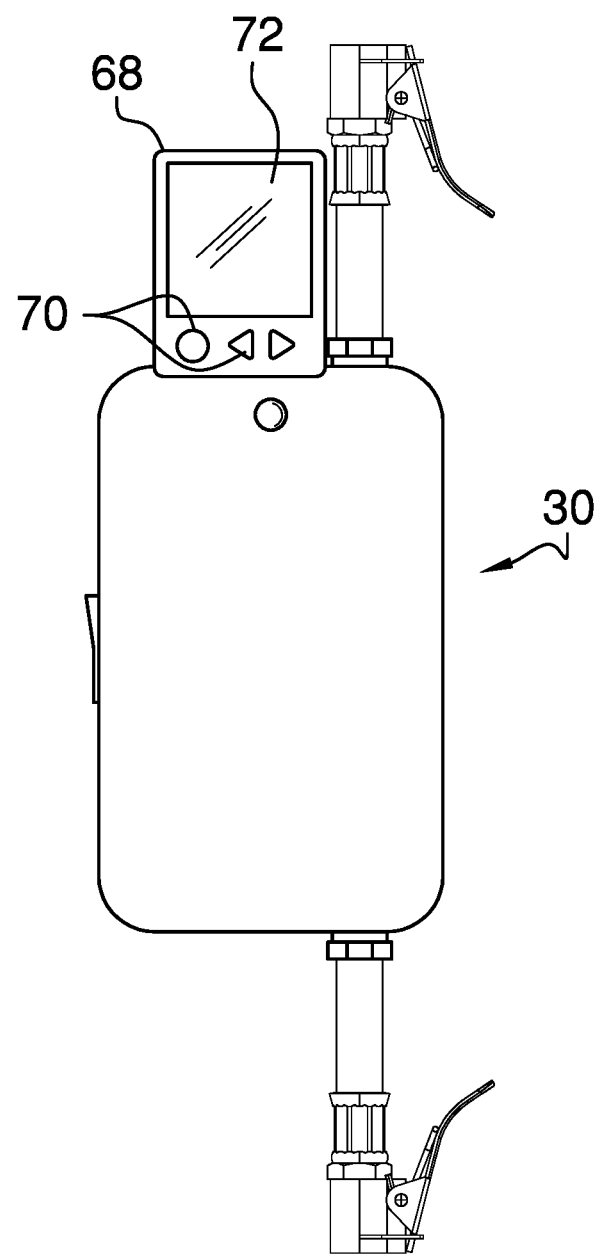
FIG. 5 is a top view of an embodiment of the disclosure showing a digital gauge.
Figure 6:
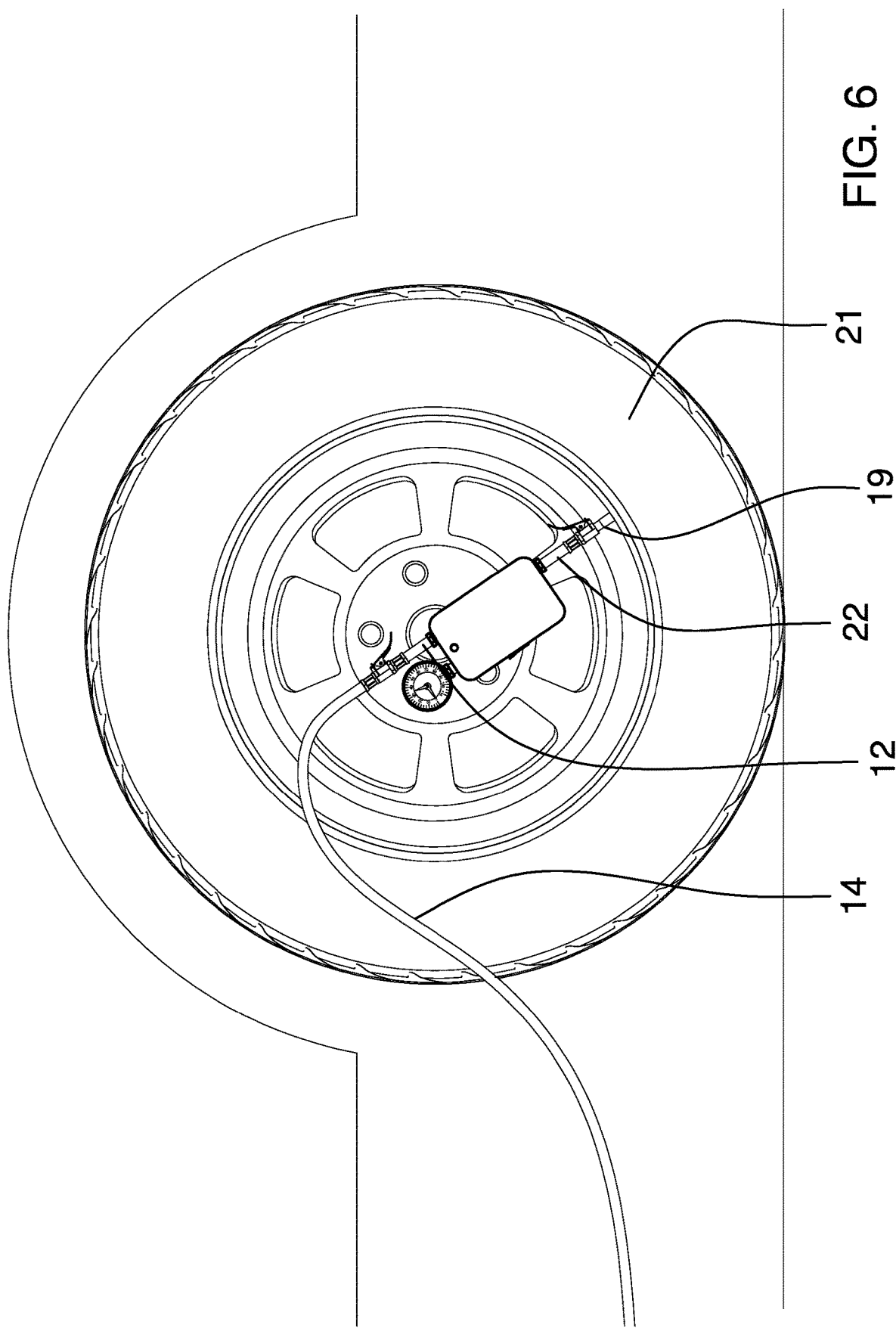
FIG. 6 is a perspective view of an embodiment of the disclosure.

With reference now to the drawings, and in particular to FIGS. 1 through 6 thereof, a new inflator device embodying the principles and concepts of an embodiment of the disclosure and generally designated by the reference numeral 10 will be described.

As best illustrated in FIGS. 1 through 6, the automatic tire inflator assembly 10 generally comprises an input hose 12 that is fluidly attachable to an air source 14 to receive compressed air from the air source 14. The air source 14 may be an air compressor, an air tank or other similar reservoir that contains compressed air. The input hose 12 has a first end 16 and a second end 18, and the second end 18 has a quick release coupler 20 for releasably engaging the air source 14 to fluidly couple the input hose 12 to the air source 14. An output hose 22 is provided and the output hose 22 is fluidly attachable to an air stem 19 of an inflatable tire 21. The inflatable tire 21 may be a tire on a vehicle, such as a passenger vehicle, a motorcycle, a bicycle, a cargo vehicle or any other type of inflatable tire. The output hose 22 has a primary end 24 and a secondary end 26, and the secondary end 26 has a quick release coupler 28 for releasably engaging the air stem 19 to fluidly couple the output hose 22 to the air stem 19.

A control unit 30 is provided and the control unit 30 is fluidly coupled to the input hose 12 to receive the compressed air from the air source 14. The control unit 30 is fluidly coupled to the output hose 22 for inflating the inflatable tire 21. Additionally, the control unit 30 senses the pressure of the compressed air received from the air source 14. The control unit 30 comprises a housing 32 that has an air conduit 34 integrated therein. The air conduit 34 has an intake 36 and an exhaust 38. The first end 16 of the input hose 12 is fluidly coupled to the intake 36 and the primary end 24 of said output hose 22 is fluidly coupled to the exhaust 38.

The control unit 30 includes a control circuit 40 that is positioned in the housing 32 and the control circuit 40 receives a shut off input. The control unit 30 includes a shut off valve 42 that is fluidly coupled to the air conduit 34, and the shut off valve 42 is electrically coupled to the control circuit 40. The shut off valve 42 is actuatable into a closed condition such that the shut off valve 42 inhibits air from flowing through the air conduit 34. Conversely, the shut off valve 42 is actuatable into an open condition such that the shut off valve 42 permits air to flow through the air conduit 34. The shut off valve 42 is actuated into the closed condition when the control circuit 40 receives the shut off input. Additionally, the shut off valve 42 is actuated into the open condition when the control circuit 40 does not receive the shut off input. The shut off valve 42 may comprise an electrically controlled air valve or the like.

The control unit 30 includes a pressure sensor 44 that is fluidly coupled to the air conduit 34 to sense air pressure within the air conduit 34. The pressure sensor 44 is electrically coupled to the control circuit 40 and the control circuit 40 receives the shut off input when the pressure sensor 44 senses air pressure that reaches or exceeds a pre-determined threshold pressure. The pressure sensor 44 may be an electronic air pressure sensor or the like.

The control unit 30 includes a speaker 46 that is coupled to the housing 32 to emit an audible alert outwardly therefrom. The speaker 46 is electrically coupled to the control circuit 40 and the speaker 46 is turned on when the control circuit 40 receives the shut off input to audibly alert a user. The control unit 30 includes a light emitter 48 that is coupled to the housing 32 for emitting light outwardly therefrom. The light emitter 48 is electrically coupled to the control circuit 40 and the control unit 30 is settable to a threshold pressure. The light emitter 48 is turned on when the control circuit 40 receives the shut off input to visually alert the user.

The control unit 30 includes a power switch 50 that is movably coupled to the housing 32. The power switch 50 is electrically coupled to the control circuit 40 and the power switch 50 turns the control circuit 40 on and off. A power supply 52 is positioned in the housing 32 and the power supply 52 is electrically coupled to the control circuit 40. The power supply 52 comprises at least one battery 54 and the power supply 52 is positioned beneath a battery cover 56 that is removably coupled to the housing 32.

A gauge 58 is provided and the gauge 58 is fluidly coupled to the control unit 30 to receive the compressed air. The gauge 58 is settable to determine the pre-determined threshold pressure. Additionally, the control unit 30 is turned off when the gauge 58 measures air pressure that exceeds the pre-determined threshold pressure. In this way the control unit 30 can inflate the inflatable tire 21 to a desired air pressure.

The gauge 58 has a rotatable bezel 60, a pressure needle 62 and a threshold needle 64. The rotatable bezel 60 is rotatable around the gauge 58 thereby facilitating the threshold needle 64 to be aligned with a desired pressure displayed on the gauge 58. In this way the gauge 58 determines the pre-determined threshold pressure. The gauge 58 is electrically coupled to the control circuit 40 thereby facilitating the control circuit 40 to communicate the pre-determined threshold pressure to the pressure sensor 44. Additionally, the gauge 58 has a supply hose 66 and the supply hose 66 extends through the housing 32 and is fluidly coupled to the air conduit 34. As is most clearly shown in FIG. 5, the gauge 58 may comprise a digital gauge 68 that includes control buttons 70 and an electronic display 72.

In use, the quick release coupler 28 on the output hose 22 is coupled to the air stem 19 of the inflatable tire 19 and the quick release coupler 20 on the input hose 12 is coupled to the air source 14. The gauge 58 is set to determine the threshold pressure, which is generally in accordance with the tire pressure recommended by the tire manufacturer. The power switch 50 is turned on to begin inflating the inflatable tire 19. The shut off valve 42 is actuated into the closed position when the air pressure in the inflatable tire 19 reaches the threshold pressure. Additionally, the speaker 46 emits the audible alarm and the light emitter 48 is turned on. In this way the user is notified when the inflatable tire 19 is properly inflated without the risk of over-inflating the inflatable tire 19. Thus, the user does not have to stay bent over to manually inflate the inflatable tire 19 as is currently required.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automatic tire inflator assembly for inflating a tire to a pre-determined pressure, said assembly comprising:
   an input hose being fluidly attachable to an air source wherein said input hose is configured to receive compressed air from the air source;
   an output hose being fluidly attachable to an air stem of an inflatable tire;
   a control unit being fluidly coupled to said input hose wherein said control unit is configured to receive the compressed air from the air source, said control unit being fluidly coupled to said output hose wherein said control unit is configured to inflate the inflatable tire, said control unit sensing air pressure for sensing the pressure of the compressed air received from the air source;
   a gauge being fluidly coupled to said control unit wherein said gauge is configured to receive the compressed air, said gauge being settable to determine said pre-determined threshold pressure, said control unit being turned off when said gauge measures air pressure that exceeds said pre-determined threshold pressure wherein said control unit is configured to inflate the inflatable tire to a desired air pressure;

wherein said input hose has a first end and a second end, said second end having a quick release coupler being fluidly coupled thereto, said quick release coupler for releasably engaging the air source to fluidly couple said input hose to the air source;

wherein said output hose has a primary end and a secondary end, said secondary end having a quick release coupler for releasably engaging the air stem to fluidly couple said output hose to the air stem;

wherein said control unit comprises
- a housing, said housing having a pair of longitudinal sides and a pair of ends extending between said pair of longitudinal sides, said input hose extending from one of said ends of said housing, said housing having an air conduit being integrated therein, said air conduit having an intake and an exhaust, said first end of said input hose being fluidly coupled to said intake, said primary end of said output hose being fluidly coupled to said exhaust, and
- a control circuit being positioned in said housing, said control circuit receiving a shut off input, and
- a power switch being movably coupled to said housing, said power switch being electrically coupled to said control circuit, said power switch turning said control circuit on and off; and wherein said gauge is coupled to said housing such that said gauge is positioned offset from said housing adjacent to said input hose, said gauge having a rotatable bezel, a pressure needle and a threshold needle, said rotatable bezel being rotatable around said gauge thereby facilitating said threshold needle to be aligned with a desired pressure displayed on said gauge for determining said pre-determined threshold pressure, said gauge being electrically coupled to said control circuit thereby facilitating said control circuit to communicate said pre-determined threshold pressure to said pressure sensor.

2. The assembly according to claim 1, wherein said control unit includes a shut off valve being fluidly coupled to said air conduit, said shut off valve being electrically coupled to said control circuit.

3. The assembly according to claim 2, wherein said shut off valve is actuatable into a closed condition such that said shut off valve inhibits air from flowing through said conduit, said shut off valve being actuatable into an open condition such that said shut off valve permits air to flow through said conduit, said shut off valve being actuated into said closed condition when said control circuit receives said shut off input, said shut off valve being actuated into said open condition when said control circuit does not receive said shut off input.

4. The assembly according to claim 1, wherein said control unit includes a pressure sensor being fluidly coupled to said air conduit wherein said pressure sensor is configured to sense air pressure within said air conduit, said pressure sensor being electrically coupled to said control circuit, said control circuit receiving said shut off input when said pressure sensor senses air pressure that exceeds a pre-determined threshold pressure.

5. The assembly according to claim 1, wherein said control unit includes a speaker being coupled to said housing wherein said speaker is configured to emit an audible alert outwardly therefrom, said speaker being electrically coupled to said control circuit, said speaker being turned on when said control circuit receives said shut off input wherein said speaker is configured to audibly alert a user.

6. The assembly according to claim 1, wherein said control unit includes a light emitter being coupled to said housing for emitting light outwardly therefrom, said light emitter being electrically coupled to said control circuit, said light emitter being turned on when said control circuit receives said shut off input wherein said light emitter is configured to visually alert the user.

7. The assembly according to claim 1, wherein said control unit includes a power supply being positioned in said housing, said power supply being electrically coupled to said control circuit, said power supply comprising at least one battery.

8. The assembly according to claim 1, wherein said gauge has a supply hose, said supply hose extending through said housing and being fluidly coupled to said air conduit.

9. An automatic tire inflator assembly for inflating a tire to a pre-determined pressure, said assembly comprising:
- an input hose being fluidly attachable to an air source wherein said input hose is configured to receive compressed air from the air source, said input hose having a first end and a second end, said second end having a quick release coupler being fluidly coupled thereto, said quick release coupler for releasably engaging the air source to fluidly couple said input hose to the air source;
- an output hose being fluidly attachable to an air stem of an inflatable tire, said output hose having a primary end and a secondary end, said secondary end having a quick release coupler for releasably engaging the air stem to fluidly couple said output hose to the air stem;
- a control unit being fluidly coupled to said input hose wherein said control unit is configured to receive the compressed air from the air source, said control unit being fluidly coupled to said output hose wherein said control unit is configured to inflate the inflatable tire, said control unit sensing air pressure for sensing the pressure of the compressed air received from the air source, said control unit comprising:
  - a housing, said housing having a pair of longitudinal sides and a pair of ends extending between said pair of longitudinal sides, said input hose extending from one of said ends of said housing, said housing having an air conduit being integrated therein, said air conduit having an intake and an exhaust, said first end of said input hose being fluidly coupled to said intake, said primary end of said output hose being fluidly coupled to said exhaust;
  - a control circuit being positioned in said housing, said control circuit receiving a shut off input;
  - a shut off valve being fluidly coupled to said air conduit, said shut off valve being electrically coupled to said control circuit, said shut off valve being actuatable into a closed condition such that said shut off valve inhibits air from flowing through said conduit, said shut off valve being actuatable into an open condition such that said shut off valve permits air to flow through said conduit, said shut off valve being actuated into said closed condition when said control circuit receives said shut off input, said shut off valve being actuated into said open condition when said control circuit does not receive said shut off input;
  - a pressure sensor being fluidly coupled to said air conduit wherein said pressure sensor is configured to sense air pressure within said air conduit, said pressure sensor being electrically coupled to said control circuit, said control circuit receiving said shut off input when said pressure sensor senses air pressure that exceeds a pre-determined threshold pressure;

a speaker being coupled to said housing wherein said speaker is configured to emit an audible alert outwardly therefrom, said speaker being electrically coupled to said control circuit, said speaker being turned on when said control circuit receives said shut off input wherein said speaker is configured to audibly alert a user;

a light emitter being coupled to said housing for emitting light outwardly therefrom, said light emitter being electrically coupled to said control circuit, said light emitter being turned on when said control circuit receives said shut off input wherein said light emitter is configured to visually alert the user;

a power switch being movably coupled to said housing, said power switch being electrically coupled to said control circuit, said power switch turning said control circuit on and off; and a power supply being positioned in said housing, said power supply being electrically coupled to said control circuit, said power supply comprising at least one battery; and a gauge being fluidly coupled to said control unit wherein said gauge is configured to receive the compressed air, said gauge being settable to determine said pre-determined threshold pressure, said control unit being turned off when said gauge measures air pressure that exceeds said pre-determined threshold pressure wherein said control unit is configured to inflate the inflatable tire to a desired air pressure, wherein said gauge is coupled to said housing such that said gauge is positioned offset from said housing adjacent to said input hose, said gauge having a rotatable bezel, a pressure needle and a threshold needle, said rotatable bezel being rotatable around said gauge thereby facilitating said threshold needle to be aligned with a desired pressure displayed on said gauge for determining said pre-determined threshold pressure, said gauge being electrically coupled to said control circuit thereby facilitating said control circuit to communicate said pre-determined threshold pressure to said pressure sensor, said gauge having a supply hose, said supply hose extending through said housing and being fluidly coupled to said air conduit.

* * * * *